(12) United States Patent
Henn et al.

(10) Patent No.: US 6,168,224 B1
(45) Date of Patent: Jan. 2, 2001

(54) TOP STORAGE COMPARTMENT LID FOR A MOTOR VEHICLE

(75) Inventors: Uwe Henn, Giengen; Dominik Beierl, Korntal-Muenchingen, both of (DE)

(73) Assignee: Ing. h.c.F. Porsche AG, Weissach (DE)

( * ) Notice: Under 35 U.S.C. 154(b), the term of this patent shall be extended for 0 days.

(21) Appl. No.: 08/986,229

(22) Filed: Dec. 5, 1997

(30) Foreign Application Priority Data

Dec. 5, 1996 (DE) .............................. 196 50 402

(51) Int. Cl.⁷ ......................................... B60J 7/20
(52) U.S. Cl. ............................................. 296/136
(58) Field of Search .............. 296/136, 107.08, 296/117

(56) References Cited

U.S. PATENT DOCUMENTS

| | | | | |
|---|---|---|---|---|
| 3,891,252 | * | 6/1975 | Lehmann | 296/136 |
| 5,197,778 | * | 3/1993 | Burst | 296/136 |
| 5,209,544 | * | 5/1993 | Benedetto | 296/136 |
| 5,533,777 | * | 7/1996 | Kleemann et al. | 296/136 |
| 5,558,389 | * | 8/1996 | Rothe et al. | 296/136 |
| 5,620,226 | * | 4/1997 | Sautter, Jr. | 296/136 |
| 5,655,331 | * | 8/1997 | Schrader et al. | 49/280 |

FOREIGN PATENT DOCUMENTS

| | | |
|---|---|---|
| 2 327 487 | 5/1973 | (DE) . |
| 38 30 393 C1 | 8/1989 | (DE) . |
| 41 13 616 C1 | 7/1992 | (DE) . |
| 195 25 587 C1 | 7/1995 | (DE) . |
| 2 300 671 | 11/1996 | (GB) . |

OTHER PUBLICATIONS

"The New Mercedes–Benz Roadster—Body: Air Conditioning, Top, and Locking" by G. Huber, W. Volz, H. Moeller, and K. Claar in ATZ Automobiltechnische Zeitschrift, 91 (1989) 6, pp. 309 to 318.

* cited by examiner

Primary Examiner—D. Glenn Dayoan
Assistant Examiner—Lori L. Coletta
(74) Attorney, Agent, or Firm—Evenson, McKeown, Edwards & Lenahan, P.L.L.C.

(57) ABSTRACT

A top storage compartment lid for a motor vehicle is associated with a rear receiving area for accommodating a stored top, and can be moved by means of a drive device from a closed position into a raised open position. The top storage compartment lid can be secured in the closed position by means of at least one releasable locking device on the fixed body. The drive device for the positioning movement of the top storage compartment lid is mechanically coupled with the locking device, and thus serves for both locking and unlocking the top storage compartment lid.

23 Claims, 12 Drawing Sheets

TOP STORAGE COMPARTMENT LID FOR A MOTOR VEHICLE

BACKGROUND AND SUMMARY OF THE INVENTION

This application claims the priority of German patent document 196 50 402.3, the disclosure of which is expressly incorporated by reference herein.

The invention relates to a top storage compartment lid for a motor vehicle.

The article entitled "The New Mercedes-Benz Roadster—Body: Air Conditioning, Top, and Locking" by G. Huber, W. Volz, H. Möller, and K. Claar in ATZ Automobiltechnische Zeitschrift, 91 (1989) 6, pages 309 to 318, describes an electrohydraulically driven top for an automobile, which is stored in the folded state in a rear storage compartment covered by a top storage compartment lid. The top storage compartment lid is movable by a drive device from a closed position into a raised open position and vice versa. On each long side of the top, the drive device comprises a hydraulic cylinder that engages a deployment lever on the top storage compartment lid. To secure the top storage compartment lid in the closed position, at least one releasable locking device is provided between the body and the top storage compartment lid, which is controlled by an additional hydraulic cylinder.

In this type of top control, the individual movements of the lid and the top storage compartment lid are handled by an electrical sequencing control. In other words, initially at least one locking device operated by a first drive device is unlocked, the unlocked position is determined as a result of microswitches being in the end position, and a positive determination is required for the positioning the top storage compartment lid by means of a second drive device, with the end positions of the lid being capable of being determined by additional microswitches. Thus, a plurality of drive devices and microswitches are required for opening and closing as well as unlocking and locking the top storage compartment lid, resulting in a high construction cost. In addition, the two successive movements require a relatively long period of time.

One object of the present invention is to reduce the construction cost in an arrangement for positioning, unlocking and locking the top storage compartment lid.

Another object of the invention is to reduce the time required for the two movements.

These and other objects and advantages are achieved by the apparatus according to the invention in which the two movements which follow one another in time, namely the unlocking or locking of the top storage compartment lid and the opening and closing of the top storage compartment lid, can be performed by a single drive device. This reduces both the construction cost and the time required for the two movements.

Microswitches for determining the position of the top storage compartment lid following locking or unlocking can be eliminated in this manner, thus reducing the number of sources of error. The drive unit for moving the top and for locking requires limited space, features a simple design, and can be designed as a preassembled structural unit that can be tested.

The mechanical device connected between the drive device for the top storage compartment lid and the at least one locking device or devices ensures that improper operation of the top storage compartment lid cannot take place and that one movement always follows the previous one. At the same time, the previous requirement for a determination by means of microswitches is eliminated.

Other objects, advantages and novel features of the present invention will become apparent from the following detailed description of the invention when considered in conjunction with the accompanying drawings.

DETAILED DESCRIPTION OF THE DRAWINGS

Figure 1:
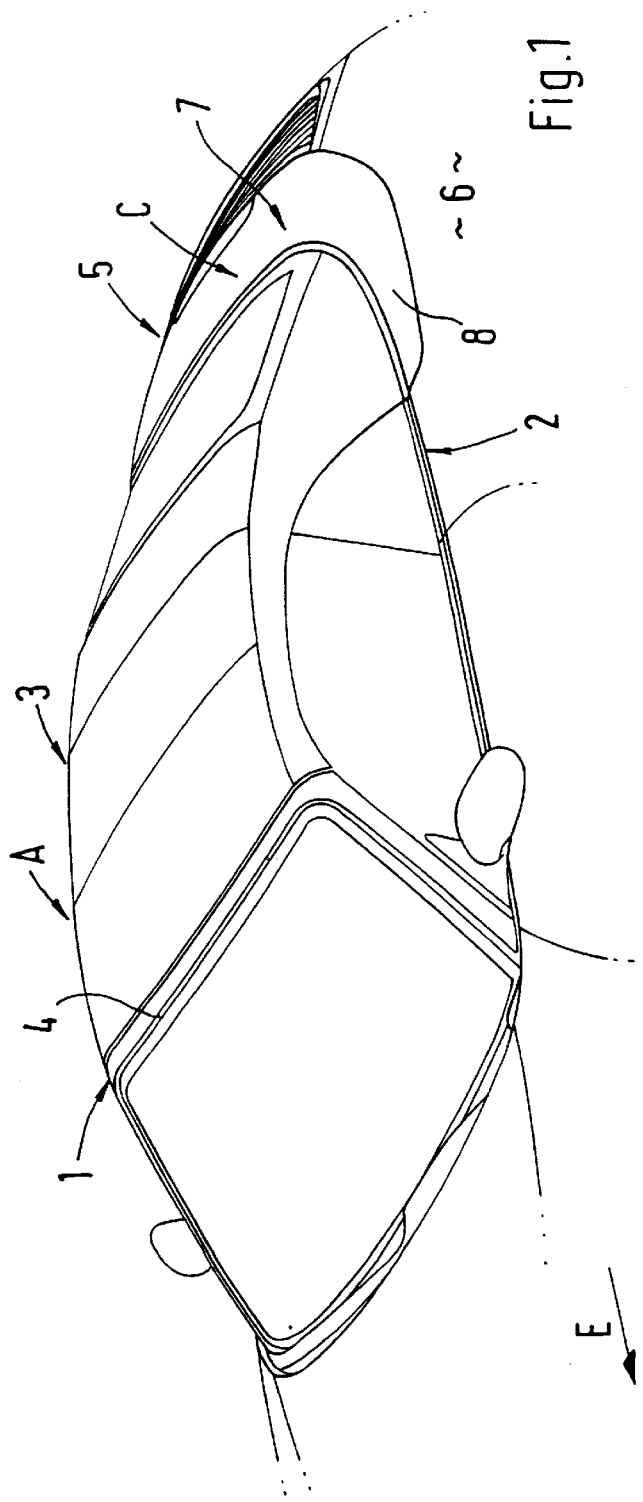
FIG. 1 is a perspective partial view looking diagonally from the front at a vehicle with a top in the closed position and a top storage compartment lid.

FIG. 1 shows a partial area of an automobile 1 that has a top 3 above a belt line 2. In this embodiment, top 3 consists of a folding top, composed in conventional fashion of a foldable top frame and a foldable top covering fastened thereto. Top 3 however could also be composed of articulated rigid parts.

Figure 2:
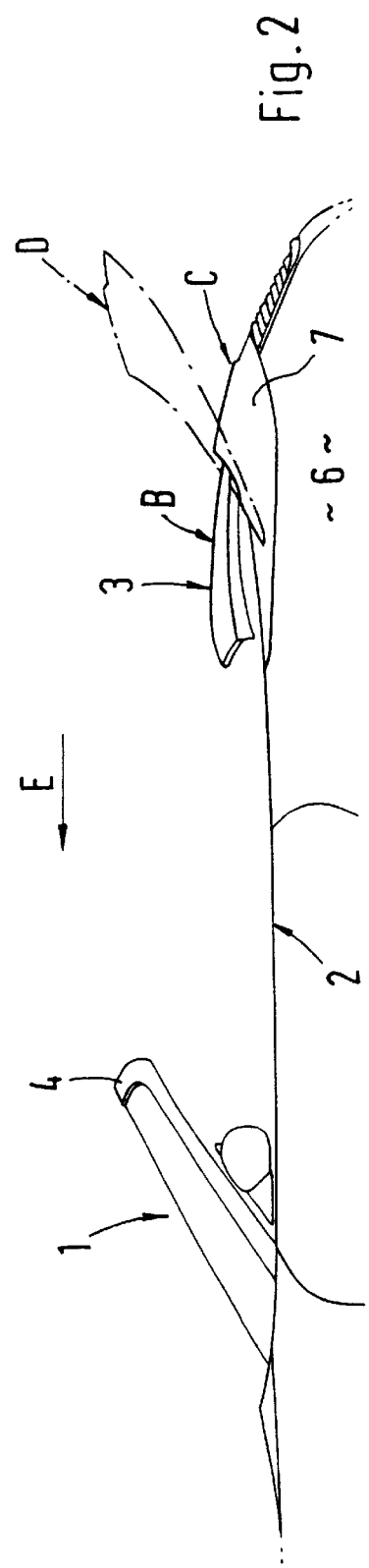
FIG. 2 is a partial side view of the vehicle, with the top assuming a storage position at the rear.

According to FIG. 1, top 3 in closed position A extends between a windshield frame 4 and a rear area 5 and is held in place on windshield frame 4 by at least one latch (not shown). In storage position B (FIG. 2) in which the top is folded back, top 3 is lowered into a rear receiving area 6, which is covered on top at least partially by a top storage compartment lid 7 (FIG. 2). Receiving area 6 provided to accommodate stored top 3 in the embodiment is constituted by a top storage compartment.

Figure 3:
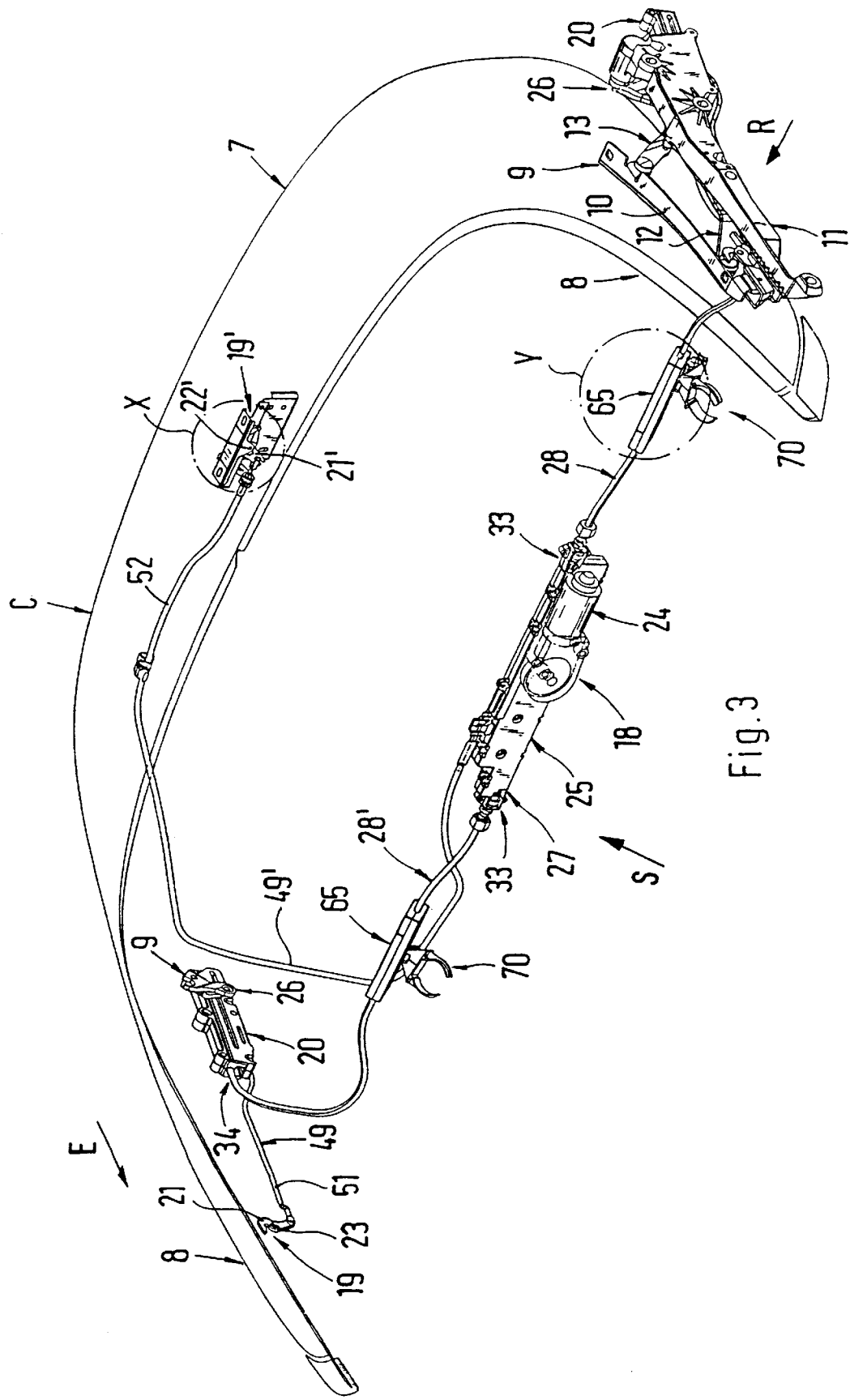
FIG. 3 is a perspective view from the front, showing the top storage compartment lid and the drive device for opening and closing as well as for locking and unlocking the top storage compartment lid.

As shown in FIG. 3, the top storage compartment lid 7, which has an approximate U-shape as seen in a top view, is connected with the adjoining fixed body by its two lengthwise extending laterally exterior legs 8. For this purpose, the lid 7 is articulated by a hinge unit 9 on each side, and can be moved from a closed position C into an open position D and vice versa. (See FIG. 2.) Each hinge unit 9 is preassembled, and includes an elongate bracket 10 that is fastened releasably to the underside of top storage compartment lid 7, a bearing block 11 mounted on the fixed body, and two deployment levers 12, 13 located with a space between them. The two deployment levers 12, 13, together with bracket 10 and bearing block 11, constitute a four-joint arrangement (parallelogram), with the upper ends of the two deployment levers 12, 13 being connected rotatably to bracket 10 and the lower ends being connected rotatably to bearing block 11.

Figure 4:
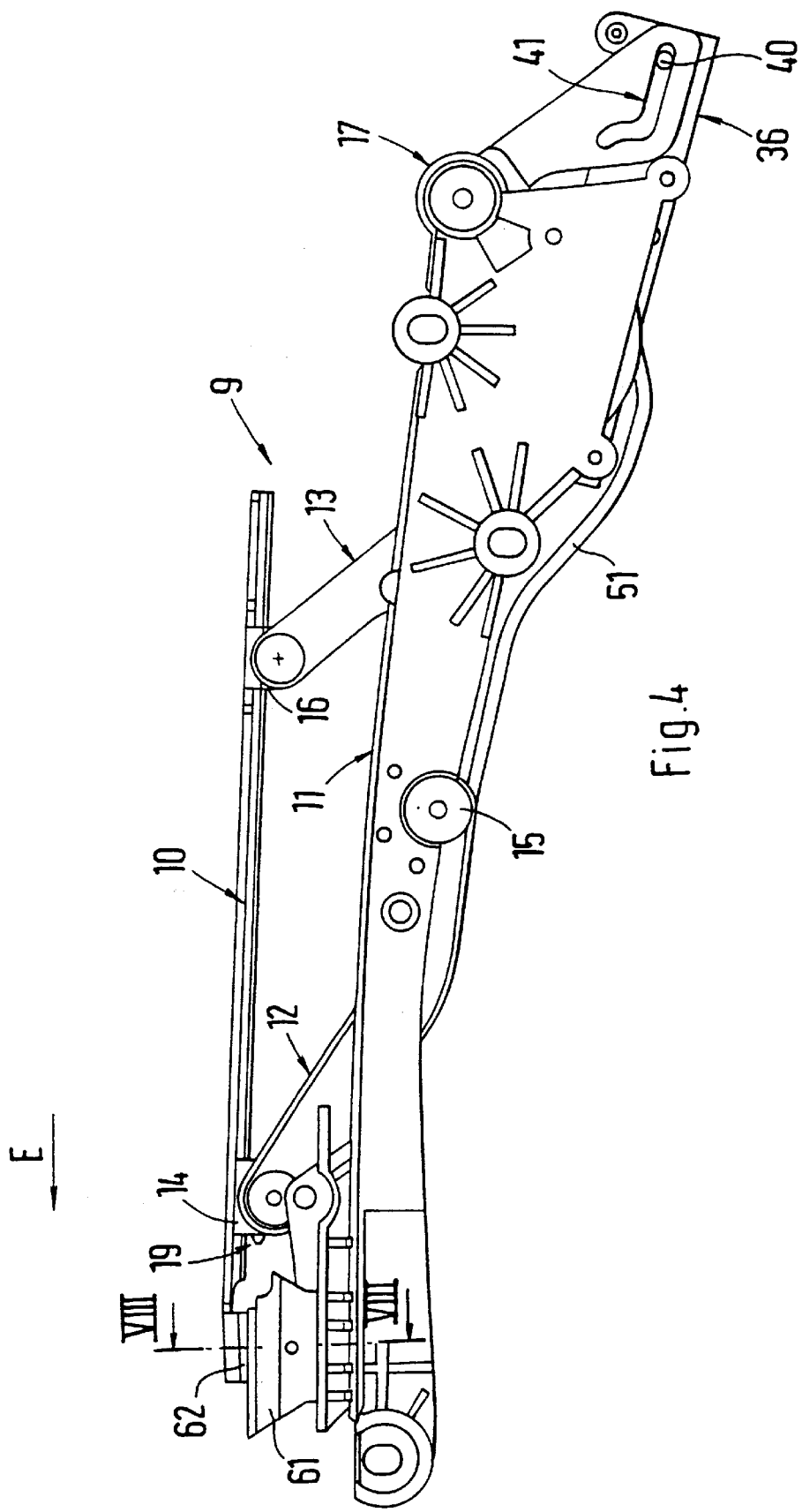
FIG. 4 is a view from the direction of arrow R in FIG. 3, showing a hinge unit and parts of the drive device in the closed position of the top storage compartment lid.
Figure 6:
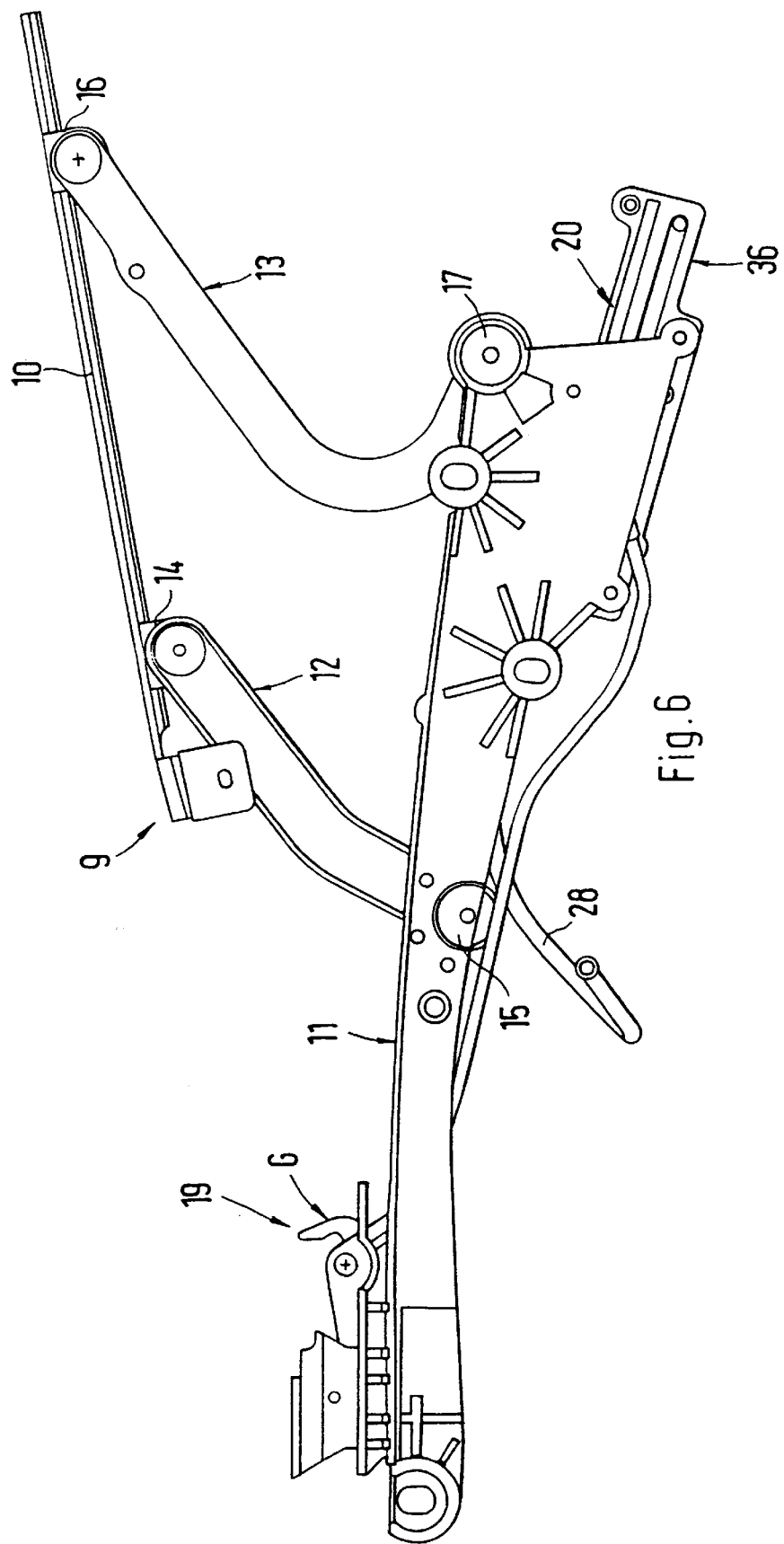
FIG. 6 is a view corresponding to FIG. 4, but with the top storage compartment lid in the open position.
Figure 7:
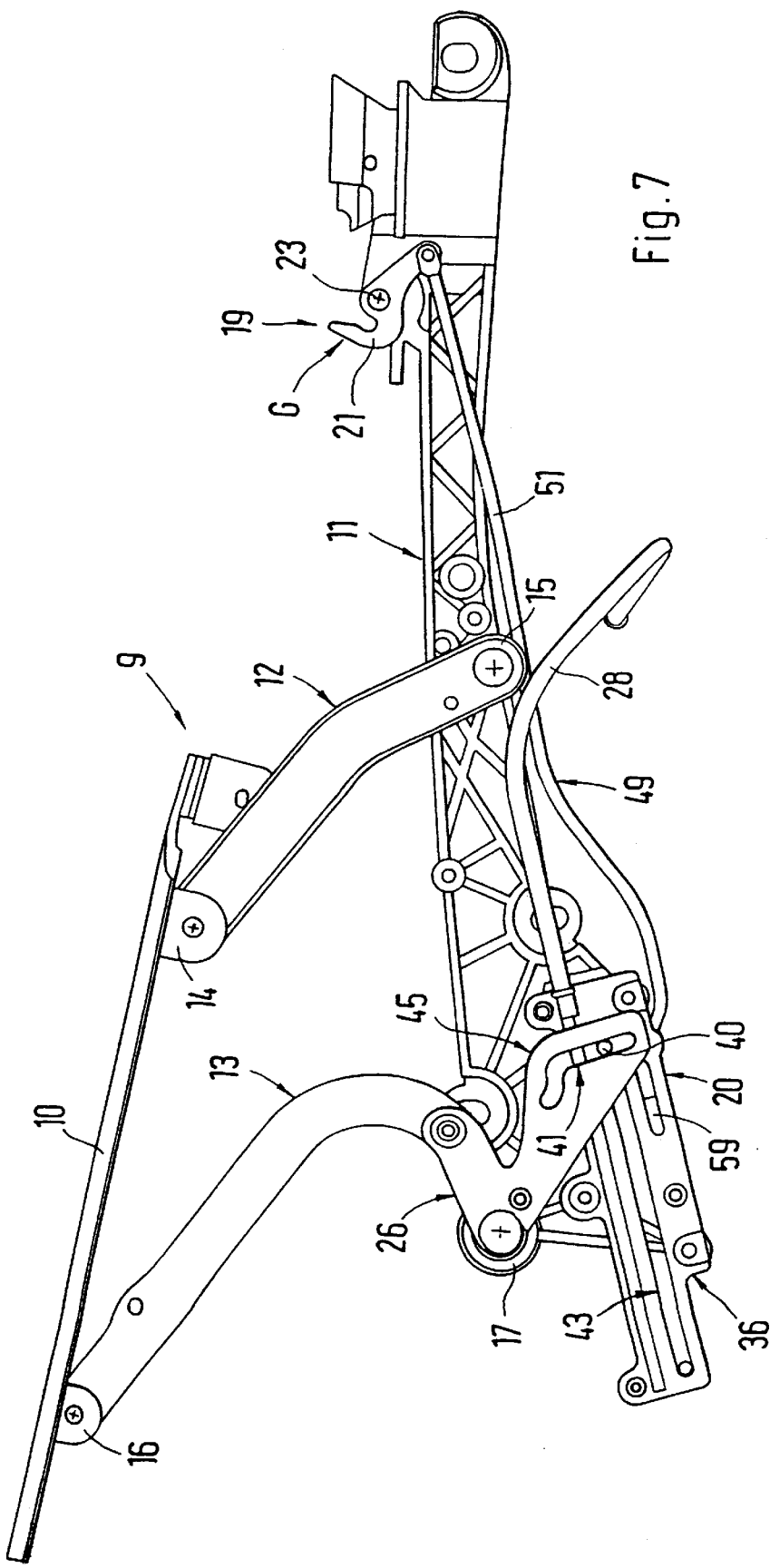
FIG. 7 is a view corresponding to FIG. 5, but with the top storage compartment lid in the open position.

As shown in FIG. 4, the deployment lever 12, located at the front (relative to the direction of travel E), is connected with a downwardly directed leg 14 of bracket 10, and with a bearing eye 15 of bearing block 11, by means of pivot pins (not shown in detail), extending transversely, and aligned approximately horizontally. The rear deployment lever 13 is rotatably connected with a downwardly directed leg 16 of bracket 10, and with another bearing eye 17, by pivot pins (not shown) which extend transversely, and are aligned approximately horizontally. Deployment lever 13 has a bent shape directed downward in portions between the two articulation points (FIGS. 6 and 7).

Figure 5:
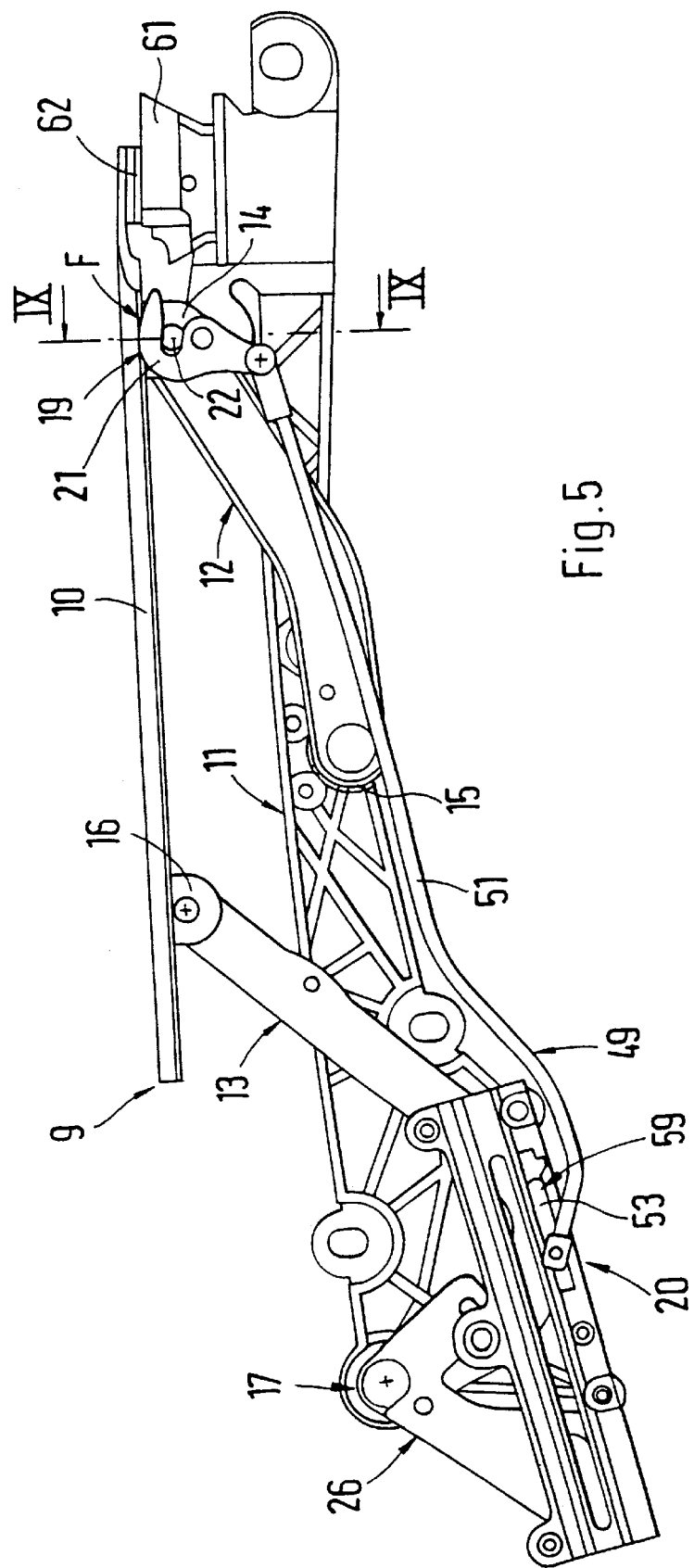
FIG. 5 is a view from the inside looking at the hinge unit and parts of the drive device in the closed position of the top storage compartment lid.

Bearing block 11 is constituted by an elongate cast part that is secured by a plurality of screwable fastening elements to the adjoining side of the body (not shown) and serves also to increase the rigidity of the body. The cast part, preferably made from a lightweight metal alloy, has a plurality of reinforcing ribs arranged in the manner of a framework (FIGS. 5 and 7).

As shown in FIG. 3, the top storage compartment lid 7 is displaceable by means of a motor drive device 18 from its closed position C through intermediate positions into a raised open position D and vice versa. (See FIG. 2.) In closed position C, top storage compartment lid 7 is secured to the fixed body by at least one releasable locking device 19, 19', as best shown in FIGS. 5–7.

According to the invention, the drive device 18, for the positioning movement of top storage compartment lid 7 (opening and closing), is linked functionwise through a mechanical device 20 with at least one of the locking devices 19, 19' and thus is also used for locking and unlocking top storage compartment lid 7.

Figure 10:
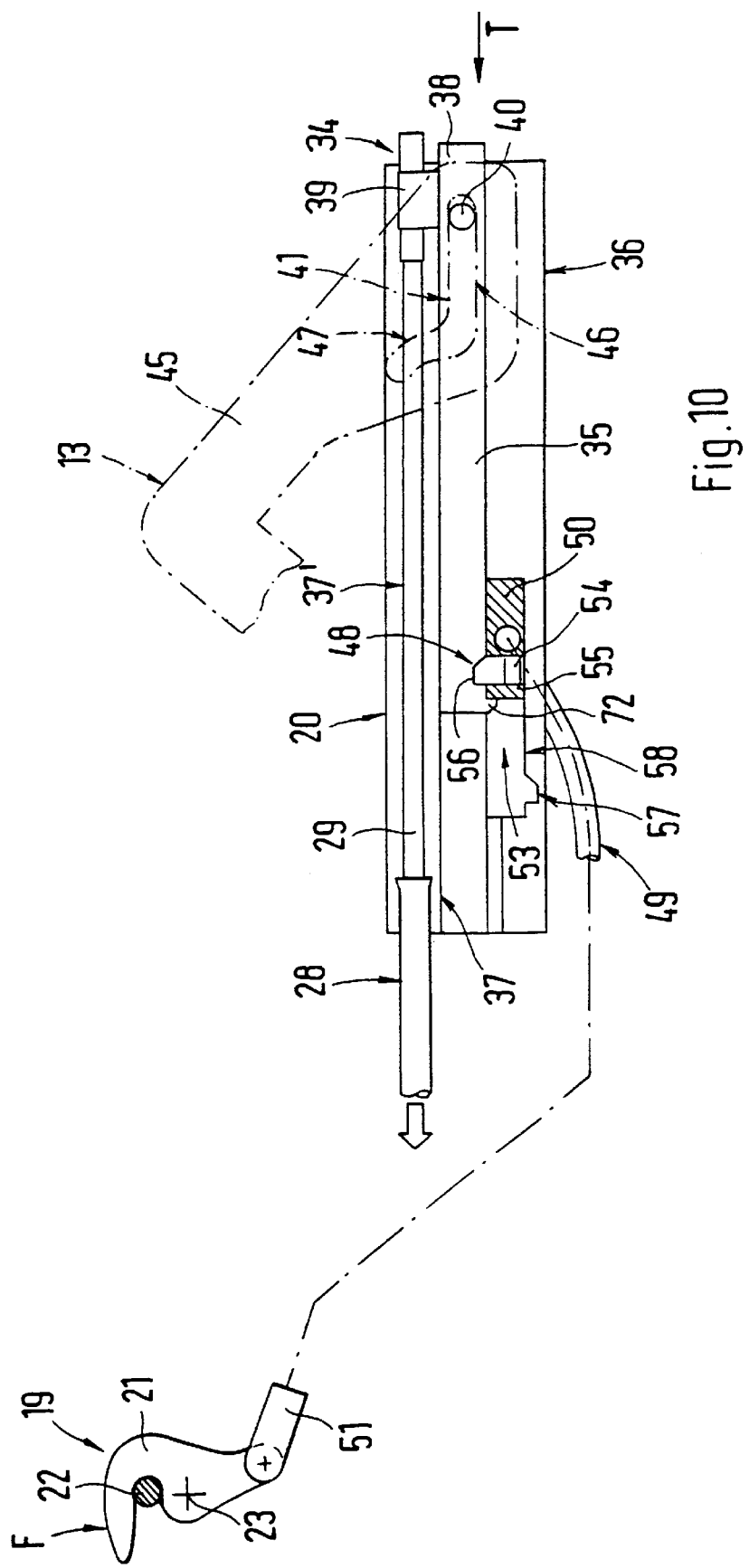
FIG. 10 is a schematic side view of the adjusting device and the lateral locking device with the top storage compartment lid closed and locked.
Figure 11:
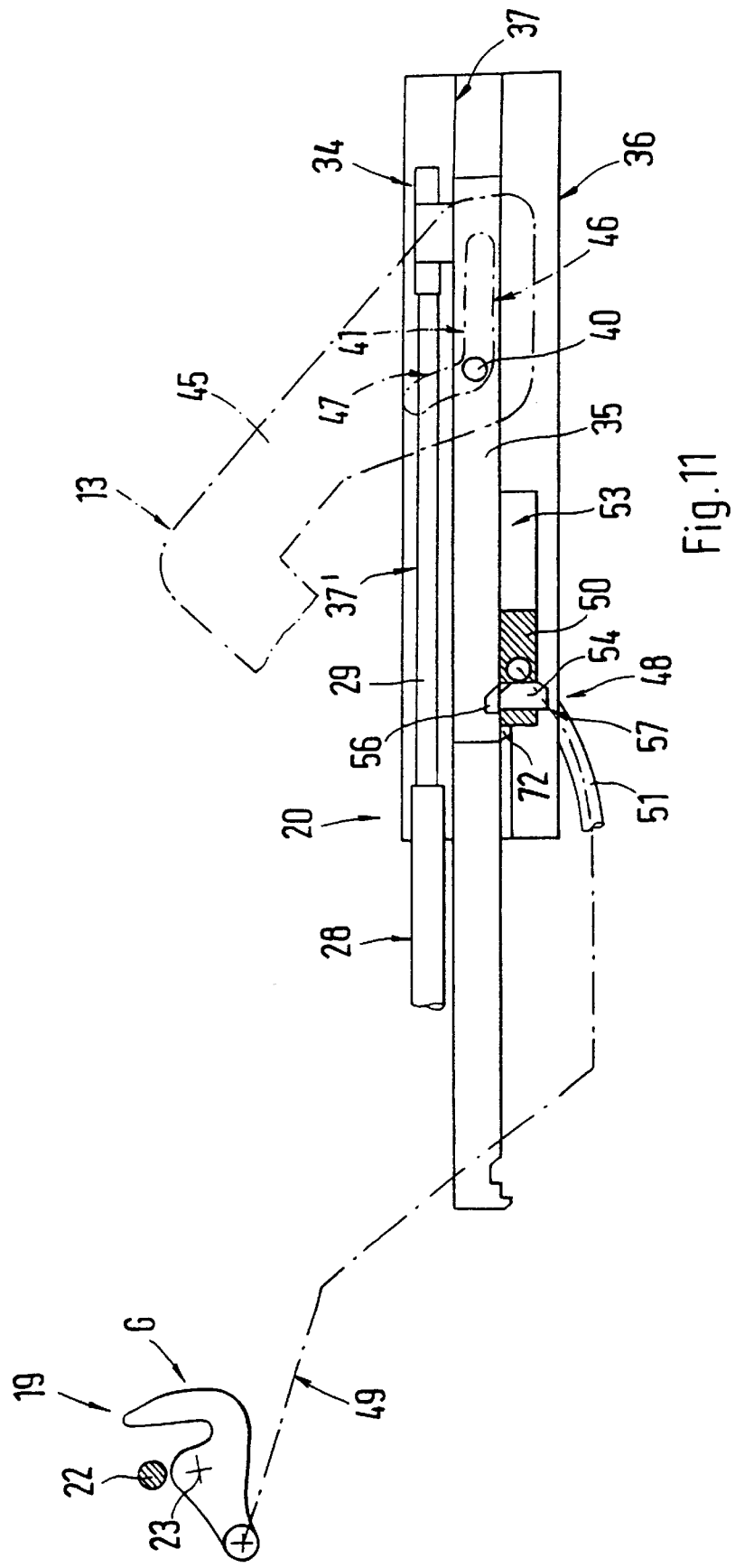
FIG. 11 is a schematic side view of the adjusting device and the lateral locking device with the top storage compartment lid closed but unlocked.
Figure 12:
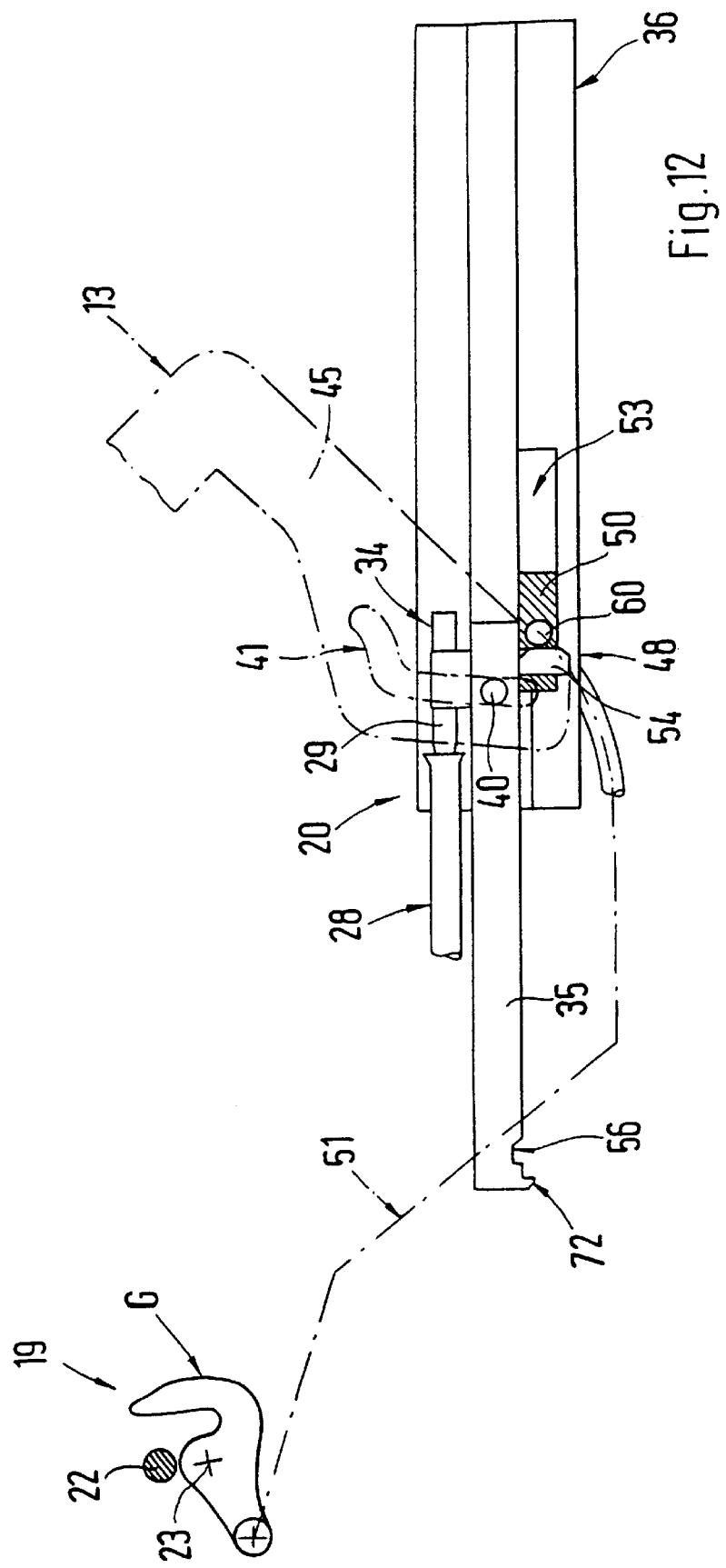
FIG. 12 is a schematic side view of the adjusting device and the lateral locking device with the top storage compartment lid open.

To secure top storage compartment lid 7 in closed position C, a plurality of locking devices 19, 19' is provided in the embodiment, namely in a forward area of the two legs 8, running lengthwise, of top storage compartment lid 7 and in a rear transverse area of top storage compartment lid 7. As shown in FIG. 3, the two anterior locking devices located outside and laterally are designated 19, while the rear locking device bears reference number 19'. Each locking device 19,19' comprises a locking hook 21, 21' that is pivotable and designed as an angle lever, with the hook being displaceable from a locking position F, F' into a release position G and vice versa (FIGS. 10–12). In locking position F, F', locking hook 21, 21' cooperates with a locking pin 22 or a retaining loop 22'. Locking hook 21, 21' is pivotably mounted to rotate around an axis of rotation 23, 23'.

By means of the mechanical device 20, during opening and closing of top 3 by means of a motor, initially locking devices 19, 19' for the top storage compartment lid 7 are pivoted from the locking position F, F' into the release position G, and then top storage compartment lid 7 is moved from closed position C into raised open position D.

Drive device 18 for top storage compartment lid 7 comprises a drive motor 24, which is mounted on the body and cooperates with at least one deployment device 26 for top storage compartment lid 7, via transmission elements 25. According to FIG. 3, deployment devices 26 are provided on both lengthwise sides of the top storage compartment lid 7.

Figure 13:
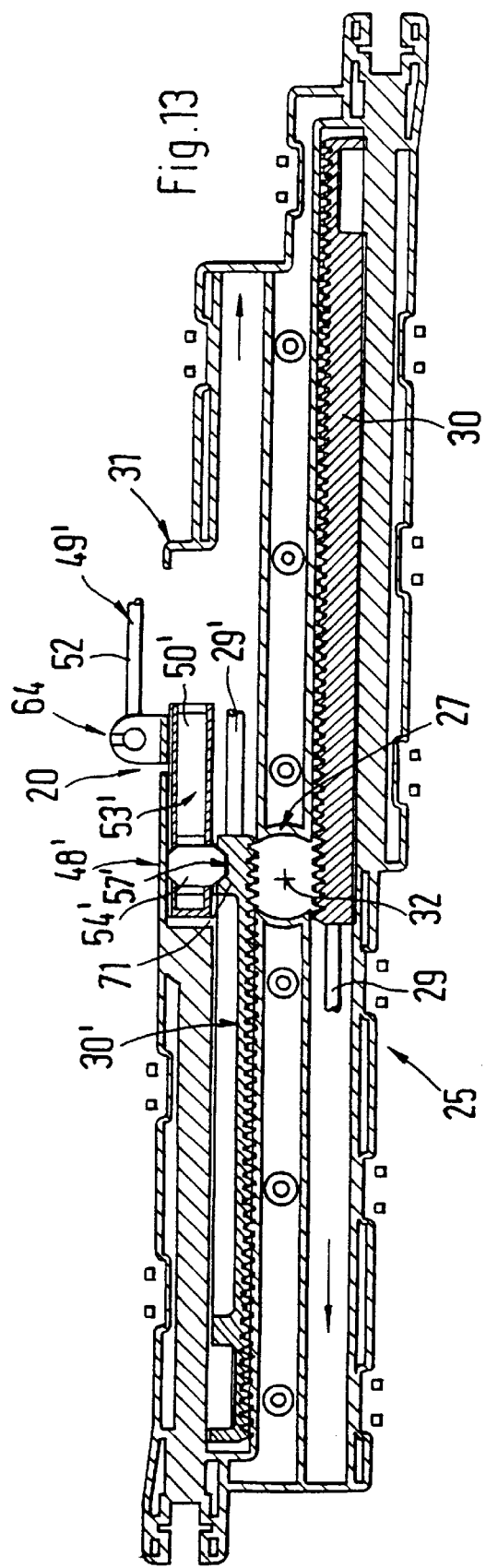
FIG. 13 is a view from the direction of arrow S in FIG. 3, partially in section, looking at the rack drive and the rear locking device cooperating therewith, together with the regulating control mechanism.

As shown in FIGS. 3 and 13, the transmission elements 25 comprise a rack drive 27 which cooperates with drive motor 24 to actuate two drive cables 29, 29' guided in rigid guide tubes 28, 28'. Each drive cable 29, 29' connects one of the racks 30, 30' of rack drive 27, (which are movable in the transverse direction) with adjusting devices 26 located externally and laterally.

Rack drive 27 is composed of a housing 31 extending in the transverse direction of the vehicle, a drive pinion 32 rotatably mounted in housing 31, and two racks 30, 30' that mesh with drive pinion 32. The racks 30, 30', which are likewise aligned in the transverse direction, and located above and below drive pinion 32, are mounted displaceably in housing 31. Drive pinion 32 is mounted in a force-transmitting manner on a drive shaft of drive motor 24 (not shown in FIG. 13).

One end 33 of each drive cable 29, 29' is permanently attached to the adjoining end area of rack 30, 30' while the other end 34 of each drive cable 29, 29' is permanently attached to a dog 35, which is movable lengthwise on the adjusting device 26. Each adjusting device 26 for top storage compartment lid 7 comprises a two-part housing 36 that extends in the lengthwise direction of the vehicle and is mounted on bearing block 11 of hinge unit 9. The displaceably mounted dog 35 is received in lengthwise guides 37, 37' of housing 36. Dog 35 comprises an elongate lower section 38, approximately rectangular in cross section, designed to match lengthwise guide 37 as well as an upper portion 39 with the shape of a keyhole and molded on the top, said section 39 being received in lengthwise guide 37' located above. The short upper section 39 is permanently attached to end 34 of the drive cable 29, 29' (FIG. 10).

The two lengthwise guides 37, 37', one located above the other, are connected together by an upright slot. Upper section 39 is provided in a rear end area of elongate lower section 38.

A laterally projecting link pin 40 of dog 35 is actively linked with a link guide 41 formed on deployment lever 13 of hinge unit 9. Link pin 40 extends in the transverse direction of the vehicle and is inserted into a matching hole 42 in dog 35, penetrating an elongate slot opening 43 in housing 36 and passing through link guide 41 formed on deployment lever 13 (FIG. 14).

Figure 14:
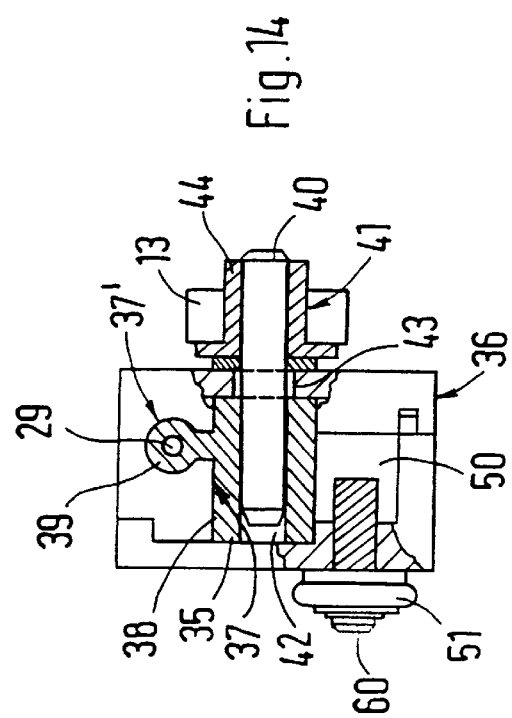
FIG. 14 is an enlarged partial sectional view from the direction of arrow T in FIG. 10.
Figure 15:
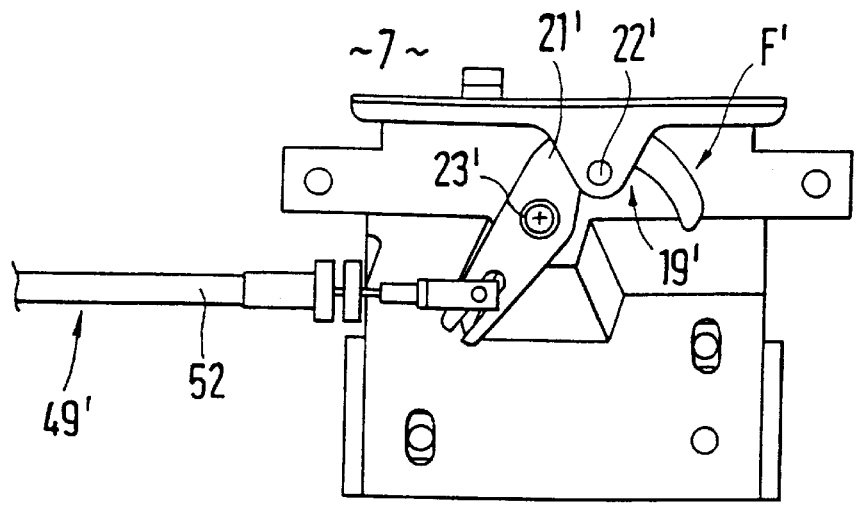
FIG. 15 shows a detail X in FIG. 3, enlarged.

According to FIG. 14, a sleeve 44 can be placed on the projecting area of cylindrical link pin 40 that cooperates with link guide 41. Link guide 41 is provided on a portion 45 of rear deployment lever 13, which is composed of two path sections 46, 47 that abut one another. Rear deployment lever 13 can be made in one or more parts. Path segments 46, 47 are adapted to the diameter of link pin 40 in such fashion that a displacement movement of link pin 40 within the link guide is ensured.

In the embodiment, a first path segment 46 is made rectilinear, while a second path section 47 is curved. With the top storage compartment lid closed, first path section 46 is flush with elongate dog 35 (FIG. 10). The mechanical device 20 which links drive device 18 with locking device 19, 19' is formed by a locking shoe mechanism 48, 48' and a connecting element 49, 49', with connecting element 49, 49' being connected at one end with pivotably mounted locking hook 21, 21' and at the other end with a slide 50, 50' of locking shoe mechanism 48, 48'. Connecting element 49 is formed by a push rod 51 (FIG. 3) for the two forward lateral locking devices 19, and by a Bowden cable 52 for rear locking device 19'. (See FIG. 3.)

The locking shoe mechanism 48 for the two lateral locking devices 19 comprises a slide 50 (FIG. 10) which is located below dog 35, mounted slidably in a lengthwise guide 53 of housing 36 that has a limited length, and a locking shoe 54, which is displaceable heightwise, and is inserted into an upright through opening 55 of slide 50. Locking shoe 54, which is rectangular as viewed from above, projects heightwise beyond dog 35, so that depending on the position of dog 35, a projecting portion of locking shoe 54 engages a first transverse groove 56 on the underside of dog 35 or a second transverse groove 57 on bottom 58 of lengthwise guide 53. Lengthwise guide 53 is located in a forward area of housing 36 and is connected directly to lengthwise guide 37 above. The two transverse grooves 56, 57, like the upper and lower edges of locking shoe 54, are provided with matching insertion bevels.

Slide 50 has a laterally projecting engaging pin 60 which extends through a lengthwise slot 59 of housing 36. The end of push rod 51 facing away from locking hook 21 is articulated to the engaging pin (FIG. 14). Link pin 40 and engaging pin 60 are located on opposite sides of housing 36.

Figure 8:
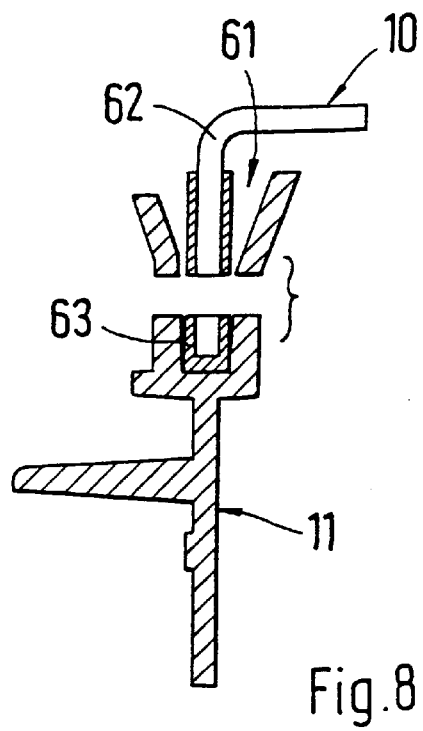
FIG. 8 is an enlarged section along line VIII—VIII in FIG. 4.

To secure closed top storage compartment lid 7 in the transverse direction of the vehicle, a funnel-shaped recess 61 open at the top is formed at the front end of bracket 10, into which recess a correspondingly shaped downwardly projecting, approximately vertical arm 62 of bracket 10 engages. To avoid rattling, portions of arm 62 are provided with a sheath 63 made of plastic or rubber (FIG. 8).

Figure 9:
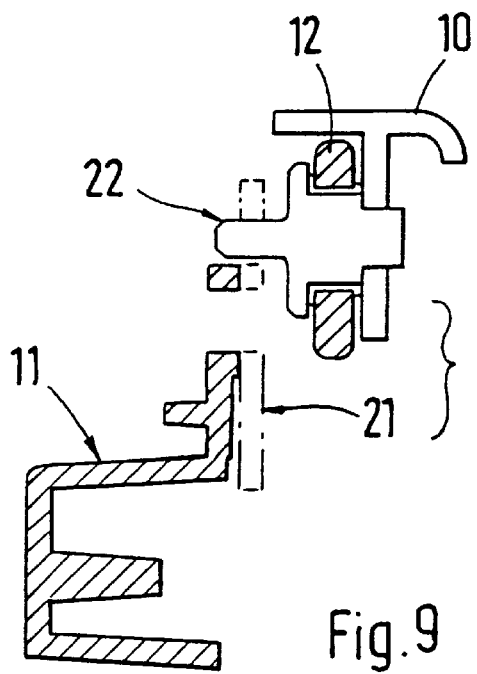
FIG. 9 is an enlarged section along line IX—IX in FIG. 5.

Locking pins 22 for lateral locking devices 19 are made integral with the upper link pins for deploying lever 12 (FIG. 9), and have their free ends extended toward the exterior of the vehicle.

Locking shoe mechanism 48' for rear locking device 19' is designed on a principle similar to that of locking shoe mechanism 48 for lateral locking device 19, with the difference that slide 50' and locking shoe 54' in locking shoe mechanism 48' cooperate with rack 30' beneath, and an upwardly projecting receiving section 64 of slide 50' is connected with one end of Bowden cable 52 (FIG. 13). Transverse groove 57' in this arrangement is provided on an upwardly directed section 71 of rack 30'.

Figure 16:
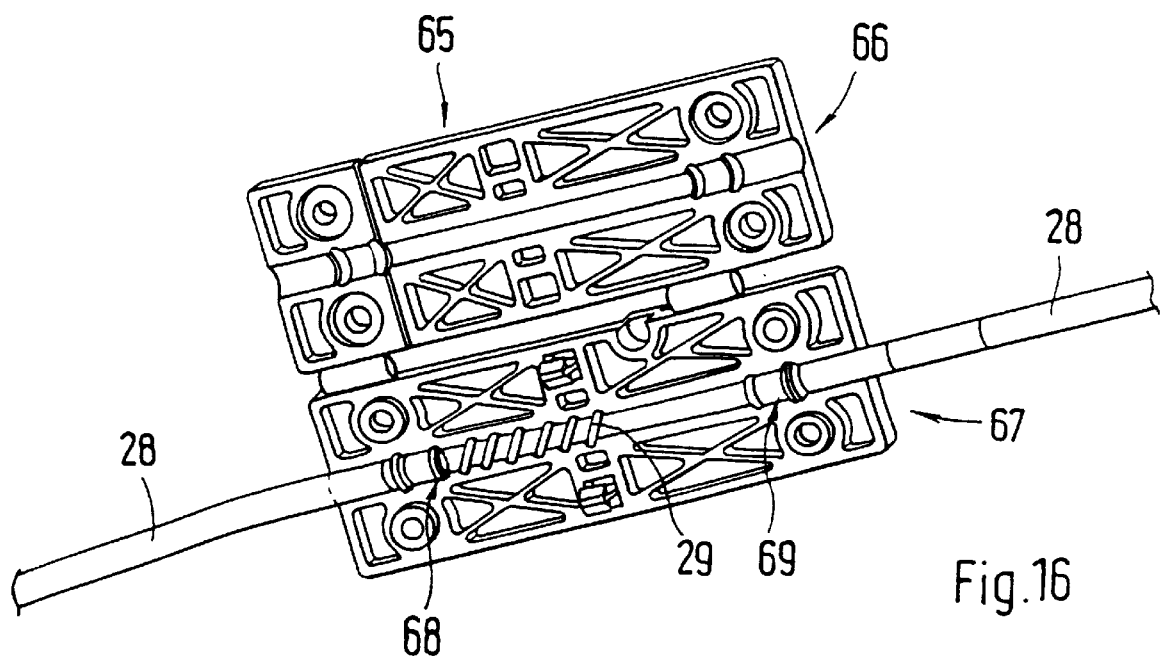
FIG. 16 shows a detail Y in FIG. 3, enlarged and unfolded.

Guide tubes 28, 28' for the two lateral exterior locking devices 19, for assembly reasons, are each made in two parts to create a bend, with the connection being made by an elongate connecting sleeve 65 (FIGS. 3 and 16). Connecting sleeve 65 comprises two halves 66, 67 connected together by hinges, each of the halves receiving end areas 68, 69 of guide tube 28.

FIG. 16 shows the unfolded position of the two halves 66, 67. Between end areas 68, 69 there is only the internal flexible drive cable 29. After guide tube 28 is placed in one half of connecting sleeve 65, the two halves 66, 67 are folded together and connected by means of a clip or screw. Connecting sleeves 65 are mounted by holders 70 on an adjoining auxiliary frame, not shown in grater detail.

The free end of the drive shaft, which is not shown in greater detail, is provided with a hex socket so that manual emergency operation of drive device 18 is possible.

In addition, a potentiometer is mounted on and rotates with the drive shaft to determine the position in which racks 30, 30' are located (not shown in greater detail).

With top storage compartment lid 7 closed and locked (see FIG. 10), the two deployment levers 12, 13 assume the position shown in FIGS. 4, 5, and 10. Link pin 40 connected with dog 35 is adjacent a rear edge of straight path section 46 of link guide 41 while locking shoe 54 engages transverse groove 56 of dog 35 above.

Slide 50 is at the rear end of lengthwise guide 53. Locking hooks 21, 21' engage locking pins 22, 22' while link pin 60 for push rod 51 is at the rear edge of elongate slot 59. The same principle applies to rear locking device 19' (see FIG. 13).

To open locking hooks 21, 21', drive motor 24 is set operating by means of a switch provided in the passenger compartment, so that both racks 30, 30' and drive cables 29, 29' connected with them are moved outward by virtue of the rigid connection with drive pinion 32.

Dog 35 moves forward about 25 mm in housing 26 as a result of the pull on drive cable 29, 29', so that slide 50 covers the same distance and locking shoe 54 drops downward by virtue of its weight into transverse groove 57 of lengthwise guide 53 (see FIG. 11). In this position, dog 35 and slide 50 beneath are uncoupled from one another. As a result of the movement in rack 30, slide 50' moves from the end position shown in FIG. 13 into its other end position in which locking shoe 54' is pushed upward out of transverse groove 57'.

As a result of the lengthwise movement of slide 50, 50' in lengthwise guides 53, 53' by means of push rods 51 and Bowden cable 52, locking hooks 21, 21' are pivoted from locking position F into unlocked position G; top storage compartment lid 7 can then be opened.

During this procedure, the two deployment levers 12, 13 of each hinge unit 9 assume their positions as shown in FIGS. 4 and 5. When locking hooks 21, 21' are unlocked, link pin 60 moves toward the forward edge of lengthwise slot 59 on the housing side and link pin 40 moves forward approximately as far as the transition area between the two path sections 46, 47 (FIG. 11).

During subsequent opening of the top storage compartment lid 7, as a result of the continuing pull on drive cable 29, 29', dog 35 moves forward in lengthwise guides 37, 37' in housing 36. At this time, slide 50 and locking hooks 21, 21' are secured in position and rear deployment lever 13, and hence forward deployment lever 12 as well, undergo a counterclockwise deflection. With link pin 40 on dog 35 and link guide 41 on rear deployment lever 13, a pivoting movement of top storage compartment lid 7 into open position D takes place.

The positions of dog 35, link pin 40, link path 41, and deployment lever 13 in open position D of top storage compartment lid 7 are shown in FIG. 12.

When top storage compartment lid 7 is closed, dog 35 is moved backward once more by pressure in drive cable 29, 29' in housing 36, so that deployment levers 12, 13 are pivoted back from the deployment position in FIGS. 6 and 7 into the resting position according to FIGS. 4 and 5, and top storage compartment lid 7 then rests on the seals again.

When top storage compartment lid 7 is locked, dog 35 again moves the last 25 mm into the resting position, whereupon slide 50 located beneath is engaged by a latch 72 and locking shoe 54 is raised by the insertion bevel from lower transverse groove 57 into upper transverse groove 56 of dog 35. During this time, locking hook 21 again engages locking pin 22; top storage compartment lid 7 is thus secured against opening. The same principle applies to rear locking hook 21' and associated locking pin 22'.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A top storage compartment lid assembly for a motor vehicle, comprising:
   a lid associated with a rear receiving area for storing a folded top;
   a drive device for causing an adjusting movement of said lid between a closed position and a raised open position, said drive device being adapted to be mounted in a spacially fixed position relative to a body of said motor vehicle; and
   at least one releasable locking device adapted to be mounted on the body of the motor vehicle, for releasably fastening said lid in the closed position; wherein
   the drive device for causing an adjusting movement of the lid is linked by a mechanical device with said at least one locking device, for locking and unlocking the lid; and
   for adjusting movement of the top into and out of the rear receiving area, the drive device is adapted to cause first an actuation of the at least one locking device into a release position, followed by an adjusting movement of the lid into the open position, while the position of said drive device remains fixed relative to said vehicle body.

2. The top storage compartment lid assembly according to claim 1, wherein a plurality of locking devices is provided to secure the lid in closed position.

3. The top storage compartment lid assembly according to claim 1, wherein the drive device comprises a drive motor which is adapted to be, mounted on the vehicle body, and cooperates through transmission elements with at least one position and adjusting device for the lid.

4. A top storage compartment lid assembly for a motor vehicle, comprising:
   a lid associated with a rear receiving area for storing a folded top,
   a drive device for moving said lid between a closed position and a raised open position; and
   at least one releasable locking device adopted to be mounted on a body of the motor vehicle, for fastening said lid in the closed position; wherein
   the drive device for movement of the top storage compartment lid is linked by a mechanical device with said at least one locking device for locking and unlocking the top storage compartment lid;
   the drive device comprises a drive motor which is adapted to be, mounted on the vehicle body, and cooperates through transmission elements with at least one position and adjusting device for the lid; and
   said transmission elements comprise
   a rack drive connected with the drive motor;
   two drive cables guided in guide tubes, which drive cables connect racks of the rack drive; and
   laterally externally located position adjusting devices to transmit forces.

5. The top storage compartment lid assembly according to claim 4 wherein the rack drive comprises:
   a housing adapted to extend in a transverse direction of the vehicle;
   a drive pinion mounted in housing; and
   two racks that cooperate with the drive pinion, the drive pinion being connected in a force-transmitting manner with a drive shaft of the drive motor.

6. The top storage compartment lid assembly according to claim 5, wherein:
   the racks displaceably mounted above or below the drive pinion in the housing are each permanently connected with a first end of the drive cable guided in the guide tubes; and
   second ends of the drive cables are each permanently attached to a dog which is movable lengthwise, on the adjusting devices.

7. The top storage compartment lid assembly according to claim 6 wherein each position adjusting device comprises an elongate housing mounted in a bearing block on a body of a hinge unit, in which housing a displaceably mounted dog is accommodated, with a projecting link pin of the dog being operatively connected with a link guide provided on a deployment lever of the hinge unit.

8. The top storage compartment lid assembly according to claim 7 wherein a link guide is provided on a section of the rear deployment lever and is composed of two path sections disposed at an angle to one another.

9. A top storage compartment lid assembly for a motor vehicle, comprising:
   a lid associated with a rear receiving area for storing a folded top;
   a drive device for moving said lid between a closed position and a raised open position; and
   at least one releasable locking device adopted to be mounted on a body of the motor vehicle, for fastening said lid in the closed position; wherein
   the drive device for movement of the top storage compartment lid is linked by a mechanical device with said at least one locking device for locking and unlocking the top storage compartment lid; and
   the mechanical device is arranged between the drive device and the locking device and comprises a locking shoe mechanism and a connecting element, with the connecting element being connected at a first end with a pivotably mounted locking hook and at a second end with a slide of the locking shoe mechanism.

10. The top storage compartment lid assembly according to claim 9 wherein the connecting element comprises a push rod.

11. The top storage compartment lid assembly according to claim 9 wherein the connecting element comprises a Bowden cable.

12. The top storage compartment lid assembly according to claim 9 wherein
   the locking shoe mechanism comprises a slide located beneath the dog, said slide being displaceably mounted in a lengthwise guide of the housing; and
   a locking shoe is inserted into an upright through opening of the slide, said shoe being displaceable heightwise, with a projecting portion of the locking shoe engaging a transverse groove on an underside of the dog or a second transverse groove on a bottom of the lengthwise guide, depending on a position of dog.

13. The top storage compartment lid assembly according to claim 12 wherein:
   to unlock the lid, the dog received in the housing is moved by the drive device in a first travel direction, whereupon a link pin is displaced in a first path section aligned parallel with the dog; and
   the slide is simultaneously moved from a rear end position by the locking shoe that engages the transverse groove of the dog until it reaches a forward end position, with the locking hook pivoting free by means of push rod.

14. The top storage compartment lid assembly according to claim 13 wherein the locking shoe, on reaching the forward end position of the slide, drops by virtue of its weight into second lower transverse groove of the housing, whereupon the push rod with the locking hook is locked in its release position and then the dog is uncoupled from the slide.

15. The top storage compartment lid assembly according to claim 14 wherein during further movement of the dog forward in the first direction of travel, the link pin of the dog moves within a link guide, causing a pivoting movement of a deployment lever on the lid.

16. The top storage compartment lid assembly according to claim 15 wherein the drive device is operably coupled with two laterally exterior locking devices located in a forward area of the lid.

17. The top storage compartment lid assembly according to claim 16 wherein the drive device is also operably coupled with an additional locking device that extends in a rear transverse area of the lid.

18. The top storage compartment lid assembly according to claim 17 wherein an additional locking hook for the additional locking device is operably coupled by a Bowden cable with a locking shoe mechanism that cooperates with an upper rack.

19. The top storage compartment lid assembly according to claim 18 wherein the locking hooks of the lateral locking devices are rotatably mounted on bearing blocks on the body, while the transverse locking pins are made integral with the pivot pins for forward deployment the levers of the hinge unit.

20. The top storage compartment lid assembly according to claim 19 wherein a receptacle which is open at a top thereof is formed at a forward edge of the bearing block to secure the lid in the transverse direction, with a downwardly projecting arm of a bracket on the lid engaging said receptacle shapewise.

21. Top box lid assembly for a rear holding area of a motor vehicle to accommodate a stored top which is moveable by a drive device from a closed position into a raised, open position and vice versa, wherein:
   the top box lid is securable in the closed position by at least one releasable locking device on the fixed body;
   the drive device causes an adjusting movement of the top box lid by means of an adjusting devices;
   the adjusting device cooperates with a pivotable locking hook designed as an angle lever with a locking pin or a retaining loop;
   the locking hook is pivotable about a rotational axis and is connected with at the least one locking device for locking or unlocking the top box lid; and
   when opening and closing the top, the adjusting devise causes the locking device, to assume(s) a release position, after which it causes an adjusting movement of the top box lid.

22. The top box lid assembly according to claim 21, wherein said drive device is adapted to be mounted in a spacially fixed position relative to a body of said motor vehicle.

23. The top box lid assembly according to claim 22, wherein an adjusting device is adapted to be mounted in a spacially fixed position relative to a body of said motor vehicle.

* * * * *